United States Patent Office

GEORGE BROWN, EDWARD E. BURNHAM, AND JOHN MORRISC, OF GLOUCESTER, MASSACHUSETTS.

Letters Patent No. 65,639, dated June 11, 1867.

IMPROVED METALLIC SURFACE COATING COMPOSITION.

The Schedule referred to in these Letters Patent and making part of the same.

TO ALL PERSONS TO WHOM THESE PRESENTS SHALL COME:

Be it known that we, GEORGE BROWN, EDWARD E. BURNHAM, and JOHN MORRISC, of Gloucester, in the county of Essex, and State of Massachusetts, have invented a new and useful Composition to be applied to a metallic or other surface for its protection from oxidation or atmospheric or other destructive or injurious action; and we do hereby declare the same, and the manner of compounding it, to be described as follows:

The ingredients and the proportions thereof constituting such composition are as follows: One hundred pounds of rosin, one hundred pounds of carbonate of lime, ten pounds of linseed oil, two and one-half pounds of native oxide of copper, and two and one-half pounds of sulphuric acid.

In compounding the said ingredients we first melt the rosin, and afterward, and while it is on the fire, stir into it the carbonate of lime, which may be chalk or whiting in a state of powder. Next stir in the linseed oil; next add the oxide of copper in a powdered state; and after allowing the whole to boil for a proper time, say about ten minutes, it is to be removed from the fire, and the sulphuric acid is to be added and incorporated with it. This composition, after having been allowed to cool, and previous to being used or spread on a surface, is to be dissolved in a suitable solvent, such as naphtha, for instance. By adding the linseed oil to the carbonate of lime and the rosin, we render the composition ductile or not liable to crack. The oxide of copper gives body and resisting powers to it, and the sulphuric acid causes it to take a firm union or hold on the surface on which it may be used. The naphtha assists in rendering it fluid, and being easily vaporizable, will readily become dissipated so as to cause the composition, when applied to a vessel's bottom, to dry with a firm body, and a polished surface, to which marine plants and animals will not easily adhere.

We claim the composition, made substantially in manner and of the ingredients set forth, and we especially claim its combination with naphtha or the equivalent thereof, the whole being substantially as and for the purpose as hereinbefore specified.

GEO. BROWN,
EDWARD E. BURNHAM,
JOHN MORRISC.

Witnesses:
BENJ. MADDOCKS,
HAZEN L. FOLLANSBEE.